Aug. 21, 1956  W. BLACKWOOD  2,759,759
RESILIENT AXLE AND CAR WHEEL ASSEMBLIES
Filed May 25, 1953
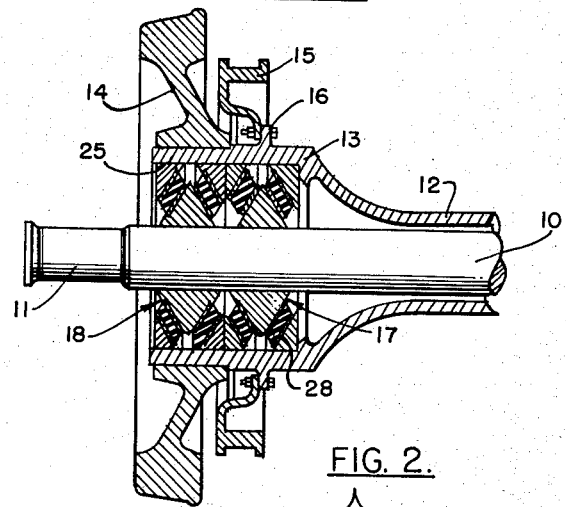
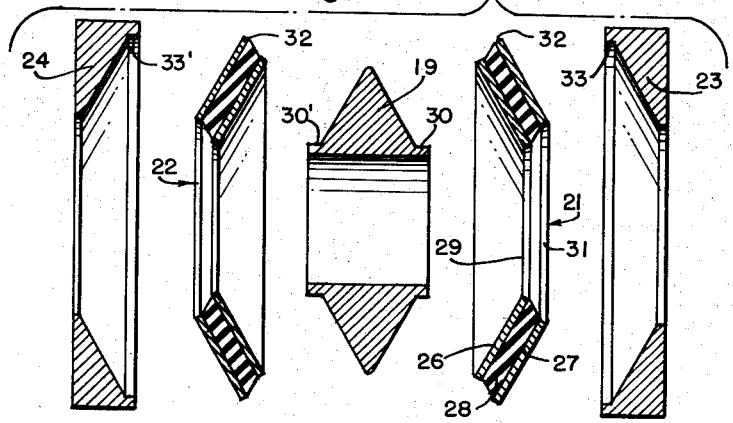
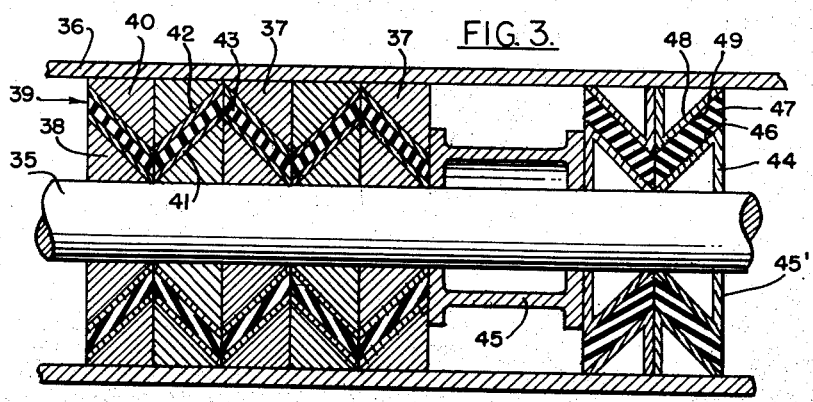
*INVENTOR*
WAVES BLACKWOOD

United States Patent Office 2,759,759
Patented Aug. 21, 1956

2,759,759

RESILIENT AXLE AND CAR WHEEL ASSEMBLIES

Waves Blackwood, Los Angeles, Calif.

Application May 25, 1953, Serial No. 356,959

1 Claim. (Cl. 295—43)

This invention relates to a resilient axle and car wheel assembly.

It is an object of the present invention to provide a car axle and wheel assembly which has embodied therein removable resilient units arranged and shaped within the axle so as to place the units so that they are both in shear and compression.

It is another object of the invention to provide a resilient axle and car wheel assembly comprising a single solid shaft adapted to be journalled at its ends in bearings and a hollow shaft surrounding the solid shaft and carrying the wheel and brake band, said hollow shaft being of greater size and supported and separated on the solid shaft by resilient rubber units through which the load of the hollow shaft is transmitted to the solid shaft, and with the rubber being placed both in shear and compression.

Other objects of the invention are to provide a resilient axle and wheel assembly having the above objects in mind which is of simple construction, has a minimum number of parts, compact, easy to assemble, durable and has long life, rugged, compact, and efficient in operation.

For a better understanding of the invention, reference may be had to the following detailed description taken in connection with the accompanying drawing, in which:

Figure 1 is a transverse sectional view of the resilient axle and car wheel assembly embodying the features of the invention;

Fig. 2 is an enlarged sectional and exploded view of one of the resilient units;

Fig. 3 is a fragmentary sectional view of a modified form of the invention employing different types of resilient units from that shown in Figs. 1 and 2.

Referring now particularly to Figs. 1 and 2, 10 represents a solid round axle having a journal bearing surface 11. Surrounding this solid axle is a hollow sleeve axle 12 that is of greater diameter than the axle in order to allow radial space therebetween and which has an enlargement 13 on which car wheel 14 is press fitted. A brake drum 15 is secured to this enlargement 13 by bolts 16 and lies adjacent to the car wheel 14.

Within the enlargement 13 are two resilient units 17 and 18.

Each unit comprises, as shown in particular in Fig. 2, a double faced conical ring member 19 that is press fitted on the solid axle 10, right and left conical resilient rubber members 21 and 22 that are fitted onto the conical surfaces of the ring member 19 and outer internally conically faced ring members 23 and 24 that encompass the resilient members 21 and 22 respectively and the ring member 19. These outer ring members 23 and 24 are press fitted upon wall 25 of the enlargement 13.

Each of the resilient members 21 and 22 comprise inner and outer conical plates 26 and 27 nested and spaced by rubber material 28 which is bonded to the opposing surfaces of these plates. The inner plate 26 has an inner peripheral edge 29 that will rest on and engage with a peripheral shoulder 30 or 30' on the ring member 19. The internal peripheral edge 31 is of greater diameter than the peripheral edge opening 29. The outer peripheral edge of the plate 31 as indicated at 32 will bear against shoulder 33 or 33' of either ring 23 or 24.

With the resilient unit assembled in the axle, the members 19, 21, 22, 23 and 24 will be brought into closely assembled relationship so that they will support and retain the axles in spaced relationship relative to one another.

When the load is being assumed by the solid axle 10, the shoulders 33 and 33' of the respective rings 23 and 24 will bear against the respective upper edges 32 of the rubber members 21 and 22 so as to transmit the vertical load through the rubber members 21 and 22, the rubber material 28 will accordingly be placed in vertical compression and also in vertical shear. The load from the rubber member is transmitted through the peripheral edge 29 of each rubber member to shoulder 30 of the double conical ring member 19 that is pressed on the solid shaft 10.

The shear and compression loading can be changed or varied in ratio to each other by changing the angle of the faces on the ring members so that they are placed under less or more shear depending upon the loads to be assumed. If heavy loads are to be assumed, these members are preferably placed under less shear and under greater compression, and accordingly the angle would be kept to a minimum. If light loads are assumed, greater resiliency is desired and accordingly the angle will be made steep as the rubber material responds and is more easily deflected when in shear. The rubber material is bonded or vulcanized directly to the metal conical plates 26 and 27.

In Fig. 3 there is shown a different arrangement and type of resilient unit. According to this form of the invention 35 represents a solid shaft and 36 represents a hollow shaft to which the car wheel and brake drum can be attached. One form of resilient unit is as indicated at 37 and comprises an inner ring member 38 having one conical face with which a resilient element 39 engages and an outer ring member 40 having an inclined face that engages with the resilient member 39. The inner ring member 38 is press fitted upon shaft 35 and the outer ring member 40 is press fitted on inner wall of hollow shaft 36. The resilient member 39 is similar to the resilient members 21 and 22 above described, but inner and outer conical plates 41 and 42 thereof are of the same size and are nested so that their peripheral edges are radially aligned with one another. These plates are separated by a rubber material 43 which is bonded to their surfaces.

These resilient units 37 are spaced from two units 44 of different form and construction from the other units which have already been described. A spacing member 45 is disposed between the units 37 and 44 to hold them in spaced relationship when the load is applied.

Each of the resilient units 44 comprises an inner hollowed member 45' having a conical face 46 to which is directly bonded rubber material 47. An outer hollow member 48 has an opposing inclined surface 49 that is also bonded to the rubber material 47. The members 44 and 48 will be respectively tight fitted upon the respective axles 35 and 36. Any vertical loading of the axles will be transmitted from one axle to the other through the resilient material 47.

It will be apparent that various changes may be made in the detail construction, but such changes shall be within the spirit and scope of the appended claim.

What is claimed is:

A resilient unit for mounting between concentric inner and outer axles comprising an inner ring member secured to the inner axle, outer ring members secured to the inner wall of the outer axle, said ring members having opposing conical faces, said internal ring member having oppositely inclined faces on the respective opposite sides thereof and shoulders adjacent the lower internal ends of the respective inclined faces, resilient members adapted to fit onto each of said inclined faces, each of said resilient members having conical inner and outer plates, the inner plate having an inner peripheral edge engaging with the shoulder on the inner ring member, each of said outer ring members having a shoulder receiving the respective outer edge of the outer plate member of said resilient members, said conical plates of each resilient member being bonded to interposed rubber material, said rings and resilient members being assembled in close coupled relationship whereby the resilient material is placed in both shear and compression upon vertical loading being applied.

References Cited in the file of this patent

UNITED STATES PATENTS

| Number | Name | Date |
|---|---|---|
| 200,903 | Edson | Mar. 5, 1878 |
| 623,883 | Cameron | Apr. 25, 1899 |
| 2,014,360 | Patch | Sept. 10, 1935 |
| 2,041,490 | Runyan | May 19, 1936 |
| 2,049,374 | Harter | July 28, 1936 |
| 2,051,864 | Knox et al. | Aug. 25, 1936 |
| 2,113,379 | Mass | Apr. 5, 1938 |
| 2,211,462 | Hobson | Aug. 13, 1940 |
| 2,433,789 | Searles et al. | Dec. 30, 1947 |
| 2,533,176 | Oelkers | Dec. 5, 1950 |

FOREIGN PATENTS

| 151,327 | Australia | May 3, 1951 |
|---|---|---|